(12) United States Patent
Baker et al.

(10) Patent No.: US 7,550,129 B2
(45) Date of Patent: Jun. 23, 2009

(54) GRAPHITE NANOFIBERS HAVING GRAPHITE SHEETS PARALLEL TO THE GROWTH AXIS

(75) Inventors: R. Terry K. Baker, Hopkinton, MA (US); Nelly M. Rodriguez, Hopkinton, MA (US)

(73) Assignee: Catalytic Materials, LLC, Pittsboro, NC (US)

( * ) Notice: Subject to any disclaimer, the term of this patent is extended or adjusted under 35 U.S.C. 154(b) by 802 days.

(21) Appl. No.: 10/969,129

(22) Filed: Oct. 18, 2004

(65) Prior Publication Data

US 2005/0135988 A1    Jun. 23, 2005

Related U.S. Application Data

(63) Continuation-in-part of application No. 09/902,113, filed on Jul. 10, 2001, now abandoned, which is a continuation-in-part of application No. 09/659,441, filed on Sep. 8, 2000, now Pat. No. 6,537,515, application No. 10/969,129, which is a continuation-in-part of application No. 10/015,353, filed on Dec. 11, 2001, now Pat. No. 6,953,562.

(51) Int. Cl.
*D01F 9/12* (2006.01)
(52) U.S. Cl. ................... 423/447.2; 977/743
(58) Field of Classification Search .............. 423/447.2; 977/743

See application file for complete search history.

(56) References Cited

U.S. PATENT DOCUMENTS

| 5,149,584 | A | 9/1992 | Baker et al. |
| 5,413,866 | A | 5/1995 | Baker et al. |
| 5,458,784 | A | 10/1995 | Baker et al. |
| 5,618,875 | A | 4/1997 | Baker et al. |
| 5,653,951 | A | 8/1997 | Rodriguez et al. |
| 6,143,689 | A | 11/2000 | Moy et al. |
| 6,159,538 | A | 12/2000 | Rodriguez et al. |
| 6,205,016 | B1 * | 3/2001 | Niu ............... 361/503 |
| 6,537,515 | B1 | 3/2003 | Baker et al. |
| 6,953,562 | B2 | 10/2005 | Baker et al. |
| 7,296,576 | B2 * | 11/2007 | Ait-Haddou et al. ...... 528/397 |

OTHER PUBLICATIONS

N.M. Rodriguez. et al.; Promotional Effect of Carbon Monoxide on the Decomposition of Ethylene Over an Iron Catalyst; Journal of Catalyst 144, 93-108 (1993); Academic Press, Inc.

Theodoridou, E., A. D. Jannakoudakis, J. O. Besenhard, and R. F. Sauter. "Carbon Fibre-Supported Noble Metal Catalysts: Optimization of Fibre Pretreatment." Synthetic Materials. 14 (1986): 125-135.

Audier, M., A. Oberlin, M. Oberlin, M. Coulon and L. Bonnetain. "Morphology and Crystalline Order in Catalytic Carbons." vol. 9, Issue 3(1981): 217-221.

Inagaki, M.. "Applications of Graphite Intercalation Compounds." J Mater. Res. vol. 4, No. 6(1989): 1560-1568.

\* cited by examiner

*Primary Examiner*—Stuart Hendrickson
(74) *Attorney, Agent, or Firm*—Henry E. Naylor; Kean, Miller, Hawthorne, D'Armond, McCowan & Jarman LLP

(57) ABSTRACT

Substantially crystalline graphitic carbon nanofibers comprised of graphite sheets that are substantially parallel to the longitudinal axis of the nanofiber, preferably wherein said graphite sheets form a multifaceted tubular structure.

6 Claims, 2 Drawing Sheets

Schematic Renditions of Various Types of Graphite Nanofibers

Platelet 1a
Tubular 1b
Ribbon 1c
Faceted Tubular 1d
Herringbone 1e

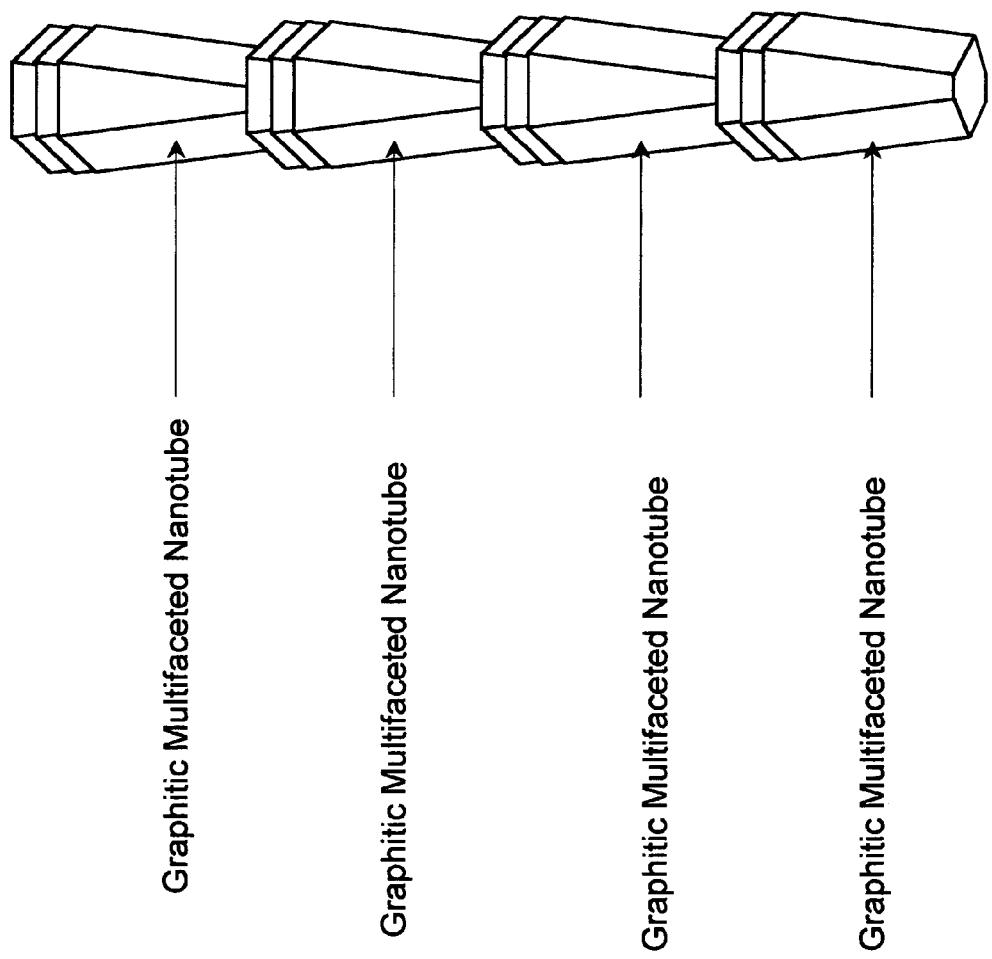

GRAPHITE NANOFIBERS HAVING GRAPHITE SHEETS PARALLEL TO THE GROWTH AXIS

CROSS-REFERENCE TO RELATED APPLICATIONS

This application is a continuation-in-part of U.S. Ser. No. 09/902,113 filed Jul. 10, 2001 now abandoned, which is a continuation-in-part of U.S. Ser. No. 09/659,441 filed Sep. 8, 2000 now U.S. Pat. No. 6,537,515. This is also a continuation-in-part of U.S. Ser. No. 10/015,353 filed Dec. 11, 2001 now U.S. Pat. No. 6,953,562.

FIELD OF THE INVENTION

This invention relates to substantially crystalline graphitic carbon nanofibers comprised of graphite sheets that are substantially parallel to the longitudinal axis of the nanofiber, preferably wherein said graphite sheets form a multifaceted tubular structure.

DESCRIPTION OF RELATED ART

Nanostructured materials, particularly carbon nano-structured materials, are quickly gaining importance for various potential commercial applications. Such applications include their use to store molecular hydrogen, to serve as catalyst supports, as reinforcing components for polymeric composites, and for use in various types of batteries. Carbon nanostructured materials are generally prepared from the decomposition of carbon-containing gases over selected catalytic metal surfaces at temperatures ranging from about 450° C. to about 1,200° C.

U.S. Pat. No. 6,537,515 to Catalytic Materials, LLC teaches a method for producing a substantially crystalline graphite nanofiber comprised of graphite platelets that are aligned substantially perpendicular to the longitudinal axis of the nanofber. Further U.S. Pat. Nos. 4,663,230 and 5,165,909 teach carbon "fibrils" which are substantially cylindrical nanotubes.

Audier, Oberlin, Oberlin, Coulon and Bonnetain (Carbon 19, 217 (1981) teach the formation of 3-D "tubes" from the decomposition of CO over Fe—Ni (25:75) and Fe—Co (50:50) alloys at temperatures of 550° C. and 600° C., respectively. It is stated in that paper that these are conical shaped nanotubes, however, no definite evidence is presented to substantiate this claim.

While various carbon nanostructures and their uses are taught in the art, there is still a need for improvements before such nanostructured materials can reach their full commercial and technical potential. For example, the most part, the ultimate purity of a given type of carbon nanostructure has been limited because of the propensity for the formation of other types of undesirable carbon forms.

SUMMARY OF THE INVENTION

In accordance with the present invention there is provided substantially crystalline graphitic nanofibers consisting essentially of substantially graphite discontinuous sheets that are substantially parallel to the longitudinal axis of the nanofiber, wherein the distance between graphite sheets is from about 0.335 nm to about 0.67 nm, and having a crystallinity greater than about 95%, wherein each of said graphite sheets are separate face-to-face sheets, not bonded to each other, which sheets are aligned substantially parallel to each other.

In another embodiment there is provided substantially crystalline graphitic nanofibers consisting essentially of at least one uninterrupted (or unbroken) substantially graphite sheet that is aligned substantially parallel to the longitudinal axis of the nanofiber and which has a substantially non-cylindrical multifaceted tubular structure, wherein when two or more of said sheets is present they are present as a tube within a tube structure and wherein the distance between graphite sheets is from about 0.335 nm to about 0.67 nm, wherein said substantially crystalline graphitic nanofiber has a crystallinity greater than about 95%.

In a preferred embodiment, the distance between the graphite sheets is from about 0.335 and 0.40 nm.

BRIEF DESCRIPTION OF THE DRAWINGS

FIG. 2 hereof is a rough representation of the primary features of the carbon non-cylindrical nanotubes produced in accordance with the present invention. It shows a non-cylindrical multi-faceted tubular structure containing a substantial number of corner sites growing from a metal catalyst particle. The multi-faceted tubular nanostructure also shows a tube within a tube structure.

DETAILED DESCRIPTION OF THE INVENTION

Figure 1:
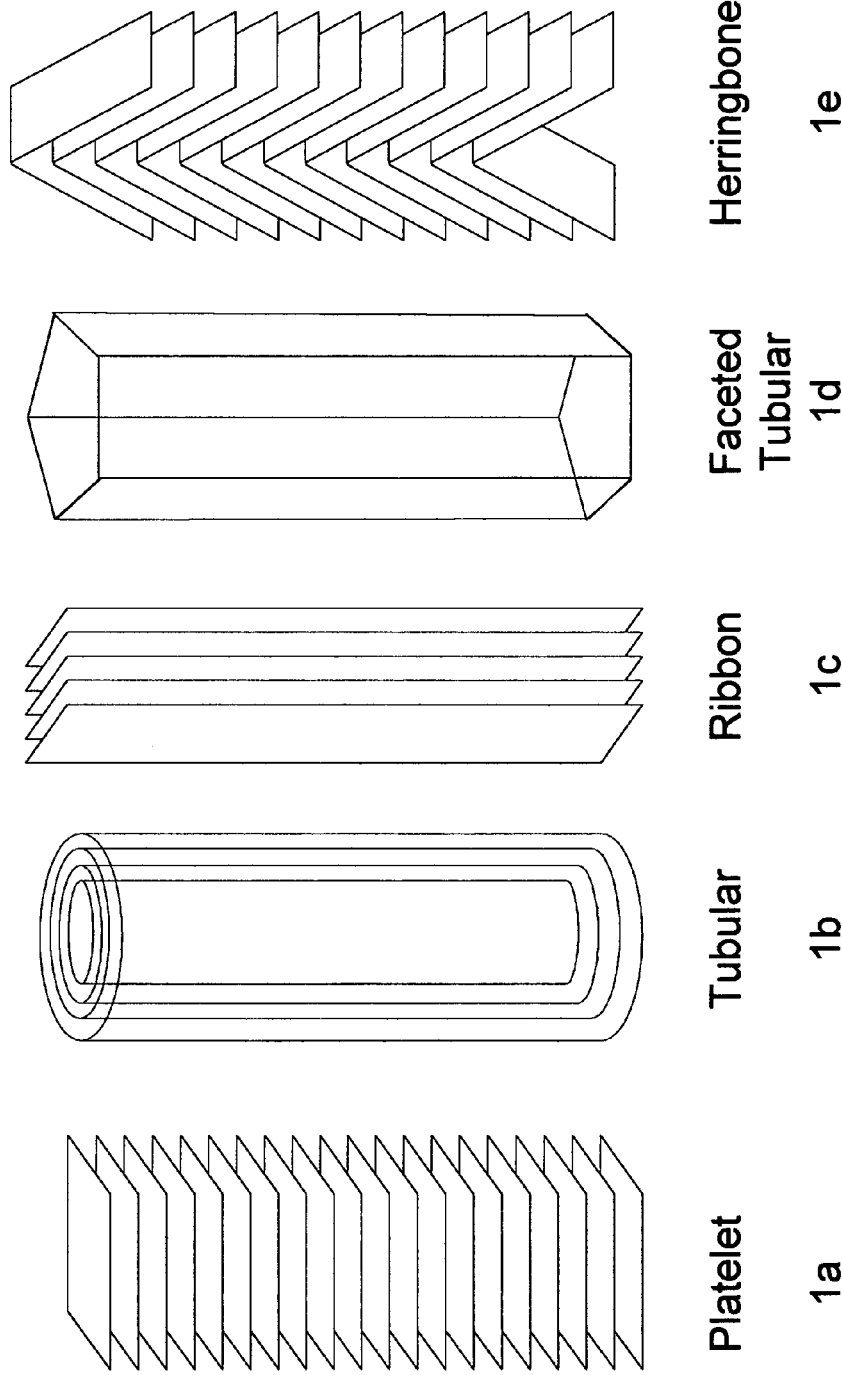
FIG. 1a is a representation of a platelet carbon nanofiber, which is comprised of substantially graphite sheets that are substantially perpendicular to the longitudinal axis, or growth axis, of the nanofiber.
FIG. 1b is a representation of a cylindrical carbon nanostructure that is comprised of continuous carbon sheets and is in the form of tube within a tube within a tube and having a substantially hollow center.
FIG. 1c is a representation of a ribbon carbon nanofiber of the present invention that is comprised of graphitic sheets that are substantially parallel to the longitudinal axis of the nanofiber.
FIG. 1d is a representation of a faceted tubular carbon nanofiber of the present invention and is comprised of continuous sheets of graphic carbon but having multifaceted flat faces. The graphitic sheets are also substantially parallel to the longitudinal axis of the nanofiber.
FIG. 1e is a representation of a herringbone carbon nanofiber wherein the graphitic platelets or sheets are at an angle to the longitudinal axis of the nanofiber.

The carbon nanofibers of the present invention possess novel structures in which graphite sheets, constituting the nanostructure, are aligned in a direction that is substantially parallel to the growth axis (longitudinal axis) of the nanofiber. There are two types of such nanofibers of the present invention. One type, which is sometimes referred to as the "ribbon" structure is comprised of a plurality of discontinuous graphite sheets. That is, they are not bonded or connected along their long edges, such sheets being aligned substantially fact-to-face with the sheet next to it. The "ribbon" structure can be thought of as having sheets comprised of a first face and a second face and wherein they are aligned face-to-face along the longitudinal axis of the nanofiber. The other type of nanofiber of the present invention are those referred to as "multifaceted" substantially non-cylindrical tubular nanofibers. Such multi-faceted tubular nanofibers can be single or multi-walled, preferably multi-walled. By multi-walled we mean that the structure can be thought of a multi-faceted tube within a multi-faceted tube, etc. The multi-faceted tubular carbon nanostructures of the present invention are distinguished from the so-called "fibrils" or cylindrical carbon nanostructures. The multi-faceted tubular nanofibers of the present invention can also be thought of as having a structure that resembles a multi-faceted pencil or Alan key. That is, a cross section of the multifaceted nanotube would represent a polygon. A single wall of the multifaceted nanotubes of the present invention can also be thought of as being a single sheet folded in such a way to resemble a multifaceted tubular structure—the folds being the corners. Further, the surface area of the carbon nanofibers can be increased by careful activation with a suitable etching agent, such as carbon dioxide, steam, or the use of a selected catalyst, such as an alkali or alkaline-earth metal.

The terms "carbon nanofibers" and "carbon nanostructures" are sometimes used interchangeably herein. The graphite sheets that compose the nanostructures of the present invention are either discontinuous sheets or faceted flat-faced arranged in a tubular structure. On the other hand, cylindrical carbon nanostructures, or "fibrils" are composed of continuous circular graphite sheets and can be represented by tube within a tube structure having a substantially hollow center. In addition, the carbon nanofibers of the present invention have a unique set of properties, that includes: (i) a nitrogen surface area from about 40 to 300 $m^2/g$; (ii) an electrical resistivity of 0.4 ohm·cm to 0.1 ohm·cm; (iii) a crystallinity from about 95% to 100%; and (iv) a spacing between adjacent graphite sheets of 0.335 nm to about 1.1 nm, preferably from about 0.335 nm to about 0.67 nm, and more preferably from about 0.335 to about 0.40 nm.

The catalysts used to prepare the carbon nanofibers of the present invention are bulk metals in powder form wherein the metal is selected from the group consisting of iron, iron-copper bimetallics, iron-nickel bimetallics and also cobalt-magnesium oxide mixtures. It is well established that the ferromagnetic metals, iron, cobalt, and nickel, are active catalysts for the growth of carbon nanofibers during decomposition of certain hydrocarbons or carbon monoxide. Efforts are now being directed at modifying the catalytic behavior of these metals, with respect to nanofiber growth, by introducing other metals and non-metals into the system. In this respect, copper is an enigma, appearing to be relatively inert towards carbon deposition during the $CO/H_2$ reaction. Thus, it is unexpected that Fe or the combination of Cu or Ni with Fe has such a dramatic effect on carbon nanofiber growth in the $CO/H_2$ system in the temperature range of about 550° C. to about 725° C. Preferably from about 650° C. to about 725° C., more preferably from about 670° C. to about 725° C., and most preferably 625° C. to about 700° C. (iron-nickel and iron-copper). For the cobalt-magnesium oxide system the preferred temperature range is 580° C. to about 600° C. Iron-nickel catalysts and cobalt-magnesium oxide are preferred for preparing the carbon nanostructures of the present invention.

The average powder particle size of the metal catalyst will range from about 0.25 nanometers to about 5 micrometer, preferably from about 1 nanometers to about 3 micrometer and more preferably from about 2.5 nanometers to about 1 micrometer. When the catalyst is a bimetallic catalyst, the ratio of the two metals can be any effective ratio that will produce substantially crystalline carbon nanofibers in which the graphite sheets are aligned substantially parallel to the longitudinal axis of the nanofiber, at temperatures from about 550° C. to about 725° C. in the presence of a mixture of $CO/H_2$. The ratio of iron to either copper or nickel will typically be from about 1:99 to about 99:1, preferably from about 5:95 to about 95:5, more preferably from about 2:8 to about 8:2; and most preferably from about 6:4 to about 8:2. The bimetallic catalyst can be prepared by any suitable technique.

One preferred technique is by co-precipitation of aqueous solutions containing soluble salts of the two metals. Preferred salts include the nitrates, sulfates, and chlorides of iron, copper, and nickel particularly the nitrates. The resulting precipitates are dried and calcined to convert the salts to the mixed metal oxides. The calcined metal powders are then reduced at an effective temperature and for an effective time.

Carbon nanostructures of the present invention are generally prepared by reacting the powdered catalyst in a heating zone with the vapor of a suitable carbon-containing compound. While the art teaches a wide variety of carbon-containing compounds as being suitable for the preparation of carbon nanostructures, the inventors hereof have found that only a mixture of CO and $H_2$ will yield carbon nanofibers with unexpected high crystallinities in the unique structures of nanofibers of the present invention in the temperature range of about 550° C. to about 725° C. That is, crystallinities greater than about 95%, preferably greater than 97% more preferably greater than 98%, and most preferably substantially 100%.

After the nanofibers are grown, it may be desirable to treat them with an aqueous solution of an inorganic acid, preferably a mineral acid, to remove excess catalyst particles. Non-limiting examples of suitable mineral acids include sulfuric acid, nitric acid, and hydrochloric acid. Preferred is hydrochloric acid.

It is within the scope of this invention to increase the spacing between the graphite sheets by any suitable means, such as by intercalation. Intercalation involves incorporating an appropriate intercalation compound between sheets. Intercalation compounds suitable for graphite structures are comprehensively discussed in *Applications of Graphite Intercalation Compounds*, by M. Inagaki, Journal of Material Research, Vol 4, No. 6, November/December 1989, which is incorporated herein by reference. The preferred intercalation compounds for use with the nanofibers of the present invention are alkali and alkaline-earth metals. The limit to which the spacing of the graphite sheets will be increased for purposes of the present invention will be that point wherein the carbon nanofibers no longer can be characterized as graphitic. That is, at the point wherein the spacing between sheets becomes so large that the carbon now has properties different than those of graphite. In most cases, the electro-conductivity is enhanced. It is important for the practice of the present invention that the carbon nanofibers maintain the basal plane structure representative of graphite.

A major advantage of the graphite nanofibers of the present invention over other graphitic materials is their flexibility with regard to modification of surface chemistry. For example, the carbon nanostructures of the present invention contain a substantial number of corner sites, which are also referred to as edge regions. The edge regions of the nanostructures of the present invention can be made either basic (introduction of $NH_4^+$ groups) or acidic (addition of $COOH^-$ groups) by use of appropriate methods. Furthermore, the presence of oxygenated groups (hydroxyl, peroxide, ether, keto or aldehyde) that are neither acidic nor basic in nature can impart polarity to the graphite structure. These groups in turn can react with organic compounds to form unique structures for separations. Polar groups will promote the interaction of carbon corner atoms with other polar groups such as water. As a consequence, the interaction of graphitic materials with aqueous solutions can be greatly enhanced due to the presence of acid, basic or neutral functionality.

The distribution of polar groups in active carbon (non-graphitic) occurs in a random fashion, whereas for the graphitic nanofibers of the present invention, such sites are located at the edges of the graphene layers. Addition of oxygenated groups can be achieved by selected oxidation treatments including treatment with peroxides, nitric acid, ozone, potassium permanganate, etc. Functionality can also be incorporated by electrochemical oxidation, at for example 2.3 volts for various periods of time. The nature of the groups will be dependent upon the oxidation time and the voltage. Polar sites can also be eliminated by reduction, out-gassing in vacuum at 1000° C. or treatment in hydrazine at about 35° C. Following this procedure, the graphite nanofiber will become hydrophobic. Theodoridou and coworkers, (Met. 14, 125 (1986)), demonstrated that very efficient surface oxidation of carbon fibers can be achieved by d.c. oxidation or repetitive anodic oxidation and cathodic reduction of the material in acidic, alkaline or neutral aqueous media. It was believed that this method had the advantage over other procedures in that thick layers of surface oxides could be produced without damaging the fiber structure. These workers also capitalized on the conductive properties of graphitized carbon fibers to introduce various noble metals onto such materials via the use of electrochemical procedures. The possibility of controlling the functionality of the graphite surface could have a direct impact on both the chemistry of the supported metal particles and their morphological characteristics.

The present invention will be illustrated in more detail with reference to the following examples, which should not be construed to be limiting in scope of the present invention.

Gas flow reactor experiments were carried out in a horizontal quartz tube (40 mm i.d. and 90 cm long) contained in a Lindberg tube furnace, at temperatures over the range of about 450° C. to 700° C. Gas flow rates to the reactor were regulated by MKS mass flow controllers. In a typical experiment, 50 mg of given catalyst powder was dispersed in a substantially uniform manner along the base of a ceramic boat, which was subsequently placed at the center of the reactor tube. After reduction of the sample at 600° C. for 2 hours, the system was flushed with helium and brought to the desired temperature level before being reacted with in the $CO/H_2$ mixture for a period of 2 hours. The total amount of solid carbon formed in any given experiment was determined at the completion of the reaction by weight difference. The composition of the gas phase was measured at regular intervals by taking samples of the inlet and outlet streams, which were then analyzed by gas chromatography using a 30 m megabore (CS-Q) capillary column in a Varian 3400 GC unit. Carbon and hydrogen atom balances, in combination with the relative concentrations of the respective components, were applied to obtain the various product yields. In order to obtain reproducible carbon deposition data it was necessary to follow an identical protocol for each experiment.

The catalyst powders used in the examples of the present invention are preferably prepared by the co-precipitation of aqueous solutions containing appropriate amounts of iron, nickel cobalt, magnesium and copper nitrates using ammonium bicarbonate. The precipitates were dried overnight at about 110° C. before being calcined in air at 400° C. to convert the carbonates into mixed metal oxides. The calcined powders are then reduced in hydrogen for 20 hours at 400° C. Following this treatment, the reduced catalyst is cooled to room temperature in a helium environment before being passivated in a 2% oxygen/helium mixture for 1 hour at about room temperature (24° C.).

The structural details of the carbon materials resulting from the interaction of the $CO/H_2$ mixtures with the various powdered bimetallic catalysts were examined in a JEOL 2000 EX II transmission electron microscope that was fitted with a high resolution pole piece capable of providing a lattice resolution of 0.18 nm. X-ray diffraction analysis of the sample was carried out to establish the degree of crystallinity of the sample. As the d-spacing approaches that of graphite (d-spacing=0.335 nm) the degree of crystalline perfection will increase. Temperature programmed oxidation studies (TPO) of the various carbon materials were carried out in a Cahn 2000 microbalance in the presence of a $CO_2/Ar$ (1:1) mixture at a heating rate of 5°/min. This test was used to determine differences in the structure and reactivity of various carbon materials.

EXAMPLE 1

In a set of experiments the overall degree of crystallinity of carbon nanofibers produced from the interaction of selected Fe:Cu catalysts with a $CO/H_2$ (4:1) mixture at 600° C. for 2.0 hours was determined from temperature programmed oxidation of the nanofibers in $CO_2$. The characteristics of the controlled gasification of carbonaceous solids in $CO_2$ provides a sensitive method of determining the structural perfection of such materials. The data shown in Table I below indicates that the degree of crystallinity of carbon nanofibers generated from an Fe—Cu (7:3) catalyst is significantly higher than that of the same type of nanofibers grown under identical reaction conditions on a pure iron catalyst.

TABLE I

Percent reactivity of carbon nanofibers in $CO_2$ as a function of reaction temperatures

| Carbon Material | 805° C. | 900° C. | 950° C. | 1000° C. | 1050° C. |
|---|---|---|---|---|---|
| Nanofibers from Fe | 29.1% | 52.0% | 72.8% | 86.2% | 100.0% |
| Nanofibers from Fe—Cu (7:3) | 5.2% | 12.8% | 30.6% | 57.0% | 100.0% |

EXAMPLE 2

In a series of characterization studies performed in a high resolution transmission electron microscope, small sections of carbon nanofibers grown from the decomposition of $CO/H_2$ mixtures at 600° C. over various metal and bimetallic catalyst systems were examined and representative micrographs taken of each sample. A compilation of the observations made from inspection of several micrographs from each sample is given in Table II below. Also included for comparison purposes are corresponding data for nanofibers grown from the interaction of the same series of catalysts with $C_2H_4/H_2$ at 600° C.

TABLE II

Comparison of structural features of carbon nanofibers from the decomposition of $CO/H_2$ (4:1) and $C_2H_4/H_2$ (4:1) over various metal and bimetallic catalysts at 600° C.

| | Nanofiber Structure | |
|---|---|---|
| Catalyst | $C_2H_4/H_2$ | $CO/H_2$ |
| Fe | No nanofiber growth | Platelet |
| Ni | Straight amorphous nanofibers | No nanofiber growth |
| Co | Straight amorphous nanofibers | No nanofiber growth |
| Fe—Ni | Straight coiled & branched "herring-bone" | Faceted Tubular/Ribbon |
| Ni—Cu | Straight coiled & branched "herring-bone" | No nanofiber growth |

TABLE II-continued

Comparison of structural features of carbon nanofibers from the decomposition of CO/H$_2$ (4:1) and C$_2$H$_4$/H$_2$ (4:1) over various metal and bimetallic catalysts at 600° C.

| Catalyst | Nanofiber Structure | |
|---|---|---|
| | C$_2$H$_4$/H$_2$ | CO/H$_2$ |
| Co—Cu | Amorphous straight, Coiled & branched | No nanofiber growth |
| Fe—Cu | Straight coiled & branched "herring-bone" | Platelet |

A carbon nanofiber having graphite sheets at an angle to the longitudinal axis of the nanofiber is referred to as a "herring-bone structure".

EXAMPLE 3

In another series of characterization studies, performed in a high resolution transmission electron microscope, samples of carbon nanofibers grown from the decomposition of CO/H$_2$ mixtures over a powdered iron catalyst at temperatures over the range 550 to 670° C. were examined. The data presented in Table III below indicates that there is a very narrow temperature window, 600° C. to 625° C., where the structures of the nanofibers are produced exclusively in the form of platelet structures. Below this temperature the solid carbon product is found to consist of a mixture of herring-bone and platelet conformations, whereas at temperatures of 650° C. there is a tendency for the structures to acquire a faceted tubular or ribbon arrangement, which becomes the only form at 670° C.

TABLE III

Characteristics of carbon nanofibers produced from the iron catalyzed decomposition of a CO/H$_2$ (4:1) mixture as a function of reaction temperature

| Catalyst | Temperature (° C.) | Nanofiber Structure |
|---|---|---|
| Fe | 550 | Herring-bone & Platelet |
| Fe | 580 | Herring-bone & Platelet |
| Fe | 600 | Platelet |
| Fe | 625 | Platelet |
| Fe | 650 | Platelet & Faceted Tubular/Ribbon |
| Fe | 670 | Faceted Tubular/Ribbon |

EXAMPLE 4

In another series of characterization studies, performed in a high resolution transmission electron microscope, samples of carbon nanofibers grown from the decomposition of CO/H$_2$ mixtures over a powdered iron-copper (7:3) catalyst at temperatures over the range 550° C. to 670° C. were examined. The observations from these experiments are presented in Table IV below.

TABLE IV

Characteristics of carbon nanofibers produced from the iron-copper (7:3) catalyzed decomposition of a CO/H$_2$ (4:1) mixture as a function of reaction temperature

| Catalyst | Temperature (° C.) | Nanofiber Structure |
|---|---|---|
| Fe—Cu (7:3) | 550 | Herring-bone & Platelet |
| Fe—Cu (7:3) | 575 | Platelet |
| Fe—Cu (7:3) | 600 | Platelet |
| Fe—Cu (7:3) | 625 | Platelet |
| Fe—Cu (7:3) | 650 | Platelet & Faceted Tubular/Ribbon |
| Fe—Cu (7:3) | 670 | Faceted Tubular |

EXAMPLE 5

Fe—Ni (25:75) with CO

Table V below shows a compilation of the different types of carbon deposits produced from the Fe—Ni/CO system at reaction temperatures of 400° C. to 750° C. It is evident that as the temperature is progressively increased so the nature of the carbon deposit changes from that of spiral nanofibers possessing a low degree of crystalline perfection to cylindrical nanotubes at intermediate temperatures and finally, to highly crystalline shell-like (onion structure) at the highest temperatures. It was found that these structures were substantially cylindrical in outline and had the graphite planes aligned in a direction parallel to the fiber axis. The cylindrical nanotubes observed at 500° C. to 600° C. had characteristics that were similar to those taught by Tennent, U.S. Pat. No. 4,663,230, from the interaction of supported Fe catalysts with various carbon-containing gases in the absence of added hydrogen.

TABLE V

| Temperature (° C.) | Characteristics of Solid Carbon Product |
|---|---|
| 400 | A few spiral nanofibers are formed via bi-directional growth that possess a turbostratic structure |
| 450 | Spiral nanofiber growth |
| 500 | Mixture of spiral nanofibers and cylindrical nanotubes |
| 550 | Cylindrical nanotube formation with a few spiral growths where the graphite sheets have a fish-bone arrangement |
| 600 | A few cylindrical nanotubes along with many graphite shells that encapsulate the catalyst particles |
| 650 | Only graphite shells are present |
| 700 | Only graphite shells are present |
| 750 | Only graphite shells are present |

EXAMPLE 6

Fe—Co (1:1) with CO

Examination of samples produced at temperatures from 400° C. to 600° C. showed that carbon nanofibers in which the graphite sheets were aligned at an angle of 30° to the longitudinal axis was the exclusive product. Close inspection of the heated structures (2900° C.) presented in FIG. 4 of the paper by Audier et al. (Carbon 19, 217 (1981) reveals the presence of loops at the inner and outer regions of the nanofibers. These conformations are produced following high temperature treatment of either "herring-bone" or "platelet" nanofiber structures. It is not possible to produce these looped structures on either multi-faceted or cylindrical nanotubes, since there are so few exposed edge regions and the sealing action create such a high stress that would destroy the nanostructure. FIG. 1 of Audier et al is a schematic diagram showing the formation of loops on "platelet" structures and the inability of tubular nanostructures to form such arrangements.

TABLE VI

| Temperature (° C.) | Characteristics of Solid Carbon Product |
| --- | --- |
| 400 | A few bi-directional nanofibers having a turbostratic "herring-bone" structure |
| 450 | Larger number of bi-directional nanofibers possessing a "herring-bone" structure |
| 500 | Bi-directional nanofibers with a well defined "herring-bone" structure |
| 550 | Nanofibers with a well defined "herring-bone" structure |
| 600 | Nanofibers with a well defined "herring-bone" structure |
| 650 | Multiple "herring-bone" nanofibers emanating from a given catalyst particle (Octopus arrangement) |
| 700 | Multiple "herring-bone" nanofibers emanating from a given catalyst particle (Octopus arrangement) |
| 750 | Only graphite shells are present |

EXAMPLE 7

Ni with CO

No evidence of any prolific growth of carbon deposits was observed in this system.

TABLE VII

| Temperature (° C.) | Characteristics of Solid Carbon Product |
| --- | --- |
| 400 | No formation of carbon deposits |
| 450 | No formation of carbon deposits |
| 500 | Some bi-directional spiral nanofibers having a "herring-bone" structure |
| 550 | Some bi-directional spiral nanofibers having a "herring-bone" structure |
| 600 | Only a few graphite shells are present |
| 650 | Only graphite shells are present |
| 700 | No formation of carbon deposits |
| 750 | No formation of carbon deposits |

EXAMPLE 8

Fe—Ni (6:4) with $CO/H_2$ (4:1)

When this Fe—Ni bimetallic was reacted in $CO/H_2$ mixtures at temperatures ranging from 450° C. to 750° C., then some distinct differences in the structural characteristics of the carbon deposits were apparent. The material generated from a Fe—Ni (6:4) catalyst with $CO/H_2$ at 625° C. to 725° C. was found to consist of a structure in which the graphite sheets were aligned in direction parallel to the longitudinal fiber axis and adopted a multi-faceted cross-sectional geometry. As the temperature was raised to 750° C. the tendency for graphite shells to be formed increased.

TABLE VIII

| Temperature (° C.) | Characteristics of Solid Carbon Product |
| --- | --- |
| 400 | A few spiral nanofibers having a "herring-bone" structure |

TABLE VIII-continued

| Temperature (° C.) | Characteristics of Solid Carbon Product |
| --- | --- |
| 450 | A few spiral nanofibers having a "herring-bone" structure |
| 500 | Some bi-directional spiral nanofibers having a "herring-bone" structure |
| 550 | Some bi-directional spiral nanofibers having a "herring-bone" structure |
| 600 | Mixture of spiral nanofibers and multi-faceted nanotubes |
| 625 | Only multi-faceted nanotubes present |
| 650 | Only multi-faceted nanotubes present |
| 700 | Only multi-faceted nanotubes present |
| 725 | Multi-faceted nanotubes present with a few graphite shells |
| 750 | Multi-faceted nanotubes and graphite shells present |

EXAMPLE 9

In-Situ TEM Studies of the Behavior of Fe—Ni Particles Supported on Carbon when Heated in the Presence of CO and $CO/H_2$ In an attempt to gain a direct insight into the effect of introducing hydrogen into a CO reactant on the morphological characteristics of Fe—Ni catalyst particles we have conducted in-situ TEM studies. This technique enables one to directly follow the changes in the appearance of a specimen as it is undergoing reaction in a gas environment. FIG. 2 shows the globular appearance of the bimetallic particles when heated at 650° C. in pure CO. Under these conditions particles indicated as "A" and "B" exhibit mobility on the surface and during collision with near neighbors undergo coalescence. This behavior is observed for a weak metal-support interaction at the Tammann temperature (0.5×M.Pt (K)). This picture can be contrasted with that shown in FIG. 3 where a similar specimen is heated in a $CO/H_2$ (4:1) mixture at the same temperature. Under these circumstances the bimetallic particles adopt a faceted outline and exhibit a relatively strong interaction with the carbon support. As a consequence, particle mobility does not take place until significantly higher temperatures. The ramifications of the difference in morphological characteristics of the Fe—Ni particles in CO and $CO/H_2$ on the subsequent growth features of the carbon nanostructures is discussed in some depth by Nolan, Lynch and Cutler, J. Phys. Chem. 102, 4165 (1998). These authors claim that the presence of $H_2$ in the reactant plays a key role in determining the morphology of deposited carbon structures. They report that $H_2$ facilitates catalyst particle fragmentation, prevents metal carbide formation, which will prolong catalyst lifetime and promotes catalyst particle reconstruction i.e. changes the arrangement of atoms at the metal particle surface.

Comparison of the Chemical and Physical Properties of Multi-Faceted MWNT and Cylindrical MWNT A series of tests was carried out to compare the chemical and physical properties of cylindrical MWNT and multi-faceted MWNT.

TABLE IX

|  | Multi-faceted MWNT | Cylindrical MWNT |
|---|---|---|
| Surface Area (m$^2$/g) | 178 | 297 |
| Average Width (nm) | 11.6 | 18 |
| d$_{002}$ XRD (nm) | 0.336 | 0.354 |
| Conductivity (Ω · cm) | 7.7 × 10$^{-2}$ | 3.2 × 10$^{-2}$ |
| Onset CO$_2$ Reactivity (° C.) | 650 | 860 |

Inspection of these data evidences the existence of some major differences between these two types of MWNT. It is quite probable that the variation in surface areas is merely a reflection of the difference in the relative widths of the two structures, with the cylindrical MWNT being the smaller, since they are generated from a supported metal catalyst rather than a bimetallic powder.

There is a 5% difference in the spacing of adjacent graphite layers with multi-faceted MWNT being very close to high purity graphite (0.335 nm). The higher value exhibited by the cylindrical MWNT is believed to be a result of the curvature of the graphite planes in these materials.

The higher degree of graphitic nature of multi-faceted MWNT is also evident from the electrical conductivity measurements as well as the X-ray diffraction analysis, 0.336 nm versus 0.354 nm (high purity graphite=0.335 nm). The major difference, however, is seen in the reactivity with CO$_2$. It was found that although multi-faceted MWNT exhibit high crystallinity as determined from the X-ray diffraction analysis, they have the ability to "activate" polar molecules including CO$_2$, which can subsequently react with the multi-faceted MWNT and gasify it.

EXAMPLE 10

Catalyst powders, Co$_x$Mg$_y$O (x:y=0.6:1), that were prepared from calcination at 500° C. followed by reduction at 600° C. were reacted in CO/H$_2$ (9:1) mixtures at various temperatures for 2.0 hour periods. The data given in Table X below shows the amounts and widths of the carbon nanotubes (CNT) formed from this mixture at 550° C. to 650° C. It is clear that the best conditions are achieved when the reaction is performed at 600° C.

TABLE X

| Reaction Temp (° C.) | (g-CNT/g-Catalyst) | CNT width range (nm) | Average width CNT (nm) |
|---|---|---|---|
| 550 | 39.0 | 2.5-22.0 | 7.7 |
| 600 | 45.0 | 2.5-24.0 | 8.0 |
| 650 | 37.0 | 4.0-34.0 | 11.5 |

EXAMPLE 11

This set experiments was designed to examine the effect of the CO/H$_2$ ratio on the formation CNT over a Co$_x$Mg$_y$O (x:y=0.6:1) catalyst at 600° C. for 2.0 hours. The mixed oxide catalyst was calcined at 500° C. and reduced at 850° C. and then reacted in various CO/H$_2$ mixtures at a flow rate of 200 cc/min.

Inspection of the results in Table XI below shows that the highest amounts of nanotubes were obtained with CO/H$_2$ mixtures containing a high fraction of CO and that the width of the structures was maintained at a constant level under these conditions. When hydrogen became the major gaseous component the yield of the solid carbon product exhibited a sharp decline and there was a corresponding increase in width of nanotubes. The preferred conditions are CO/H$_2$ ratio of between 39:1 and 2:1. The most preferred being between 19:1 and 4:1.

TABLE XI

| CO/H$_2$ ratio | (g-CNT/g-Catalyst) | CNT width range (nm) | Average width CNT (nm) |
|---|---|---|---|
| 100:1 | 19.0 | 4.0-37.0 | 12.6 |
| 39:1 | 37.0 | 3.0-25.0 | 9.5 |
| 19:1 | 38.0 | 2.5-24.0 | 8.9 |
| 12:1 | 36.0 | 2.5-23.0 | 8.6 |
| 9:1 | 36.0 | 2.5-23.0 | 8.6 |
| 4:1 | 35.0 | 2.5-24.0 | 8.7 |
| 2:1 | 32.0 | 4.0-29.0 | 11.9 |
| 1:1 | 29.0 | 5.0-39.0 | 17.0 |
| 2:3 | 17.0 | 5.0-44.0 | 20.7 |
| 1:2 | 4.0 | 5.0-49.0 | 22.4 |

What is claimed is:

1. A crystalline graphitic nanofiber consisting essentially of at least one uninterrupted, unbroken, substantially graphite sheet that is aligned substantially parallel to the longitudinal axis of the nanofiber and which has a substantially non-cylindrical multifaceted tubular structure, wherein when two or more of said sheets is present they are present as a tube within a tube structure and wherein the distance between graphite sheets is from about 0.335 nm to about 0.67 nm, wherein said substantially crystalline graphitic nanofiber has a crystallinity greater than about 95%.

2. The nanofiber of the claim 1 wherein the distance between the graphite sheets is from about 0.335 and 0.40 nm.

3. The nanofiber of claim 1 wherein at least a portion of the edge regions of the nanofiber contain a functional group selected from the group consisting of basic groups, acidic groups, and oxygenated groups.

4. The nanofiber of claim 3 wherein the functional group is a basic group that is a NH$_4$+ group.

5. The nanofiber of claim 3 wherein the functional group is an acid group which is a COOH$^-$ group.

6. The nanofiber of claim 3 wherein the functional group is an oxygenated group selected from the group consisting of hydroxyl, peroxide, ether, keto, and aldehyde.

* * * * *